United States Patent [19]

Wassell

[11] Patent Number: 4,942,723
[45] Date of Patent: Jul. 24, 1990

[54] SOLAR POWERED LAWNMOWER
[76] Inventor: Stephen R. Wassell, 8542 Mt. Vernon Hwy., Alexandria, Va. 22309
[21] Appl. No.: 410,549
[22] Filed: Sep. 21, 1989
[51] Int. Cl.$^5$ .................... A01D 34/00; A01D 69/00
[52] U.S. Cl. .................... 56/10.6; 56/10.1; 56/320.1; 136/291; 320/61
[58] Field of Search .................... 56/13.6, 10.6, 10.7, 56/10.1, 320.1, 320.2, 14.7; 136/291; 180/2.2, 65.3; 320/61, 2

[56] References Cited

U.S. PATENT DOCUMENTS

| | | | |
|---|---|---|---|
| 3,212,244 | 10/1965 | Wilgus | 56/320.1 X |
| 3,404,519 | 10/1968 | Demers | 56/14.7 |
| 3,444,946 | 5/1969 | Waterbury | 320/2 X |
| 3,729,912 | 5/1973 | Weber | 56/320.1 |
| 4,141,425 | 2/1979 | Treat | 180/65.3 X |
| 4,311,204 | 1/1982 | Shupert | 56/14.7 X |
| 4,333,302 | 6/1982 | Thomas | 56/10.6 X |
| 4,602,694 | 7/1986 | Weldin | 180/2.2 |
| 4,719,742 | 1/1988 | Ermacora et al. | 56/13.6 X |
| 4,744,430 | 5/1988 | McCoy | 180/2.2 |

FOREIGN PATENT DOCUMENTS

| | | | |
|---|---|---|---|
| 3347054 | 7/1985 | Fed. Rep. of Germany | 180/2.2 |
| 0093173 | 4/1988 | Japan | 136/291 |

OTHER PUBLICATIONS

*Impact* 2000, Winter–Spring 1987, Apr. 9, 1987, p. 11.

Primary Examiner—George A. Suchfield

[57] ABSTRACT

A solar powered lawnmower is disclosed comprising an electric motor, a rechargeable battery pack, and a panel of photovoltaic cells built into the handle of the lawnmower. The angle of the handle is arranged to ensure that the photovoltaic cells will receive nearly maximal solar exposure when the lawnmower is left in the sun with the angle of the handle approximately perpendicular to the sun's rays. In case of insufficient photovoltaic recharging, the solar powered lawnmower comprises the means to employ standard AC current to recharge the battery pack. The solar powered lawnmower is used to mow a lawn without generating air pollution or excessive noise pollution.

2 Claims, 1 Drawing Sheet

SOLAR POWERED LAWNMOWER

BACKGROUND OF THE INVENTION

1. Field of the Invention

This invention generally relates to a lawnmower. In particular, this invention relates to a lawnmower powered by an electric motor, which avoids the air and noise pollution that would be caused at the lawnmowing site by employing an internal combustion engine. This invention further relates in particular to a lawnmower employing a solar powered electric motor which avoids the use of the inconvenient cord and the utility electricity costs of a conventional electric motor, and also a portion of the pollution caused by the utility electricity generator.

2. Description of the Prior Art

A large percentage of domestic lawnmowers available at present are powered by gasoline. While it is very convenient to utilize gasoline as an energy source for powering lawnmowers, such use has become an air pollution problem in many areas. In fact, the South Coast Air Quality Management District, a governmental organization including representatives from both Los Angeles County and California State governments, has been analyzing exactly this problem, among others, in an effort to provide solutions to combat the smog problems in southern California. It has become apparent that, in the near future, lawnmowers must be designed to be less polluting than they are at present. Indeed, the Air Quality Management Plan (March 1989) for the South Coast Air Basin includes a proposal for the electrification of lawnmowers in the future. A second problem with gasoline powered lawnmowers is the excessive noise pollution that they produce.

Electric lawnmowers are available at present, and they do not cause air pollution, nor do they cause excessive noise pollution, at the site where they are used to mow the lawn. However, most electric lawnmowers available at present are very inconvenient in that they require the use of an extension cord which invariably gets in the way of mowing the lawn. In order to solve this problem, rechargeable electric lawnmowers have been disclosed in the prior art, an example being U.S. Pat. No. 3,212,244. However, problems remain with electric lawnmowers whose batteries are recharged with standard AC current. Namely, the user of the lawnmower must pay for the electricity used, and the production of said electricity results in air pollution at the utility where the electricity is generated.

Therefore, it is an object of the present invention to provide a solar powered lawnmower which will be used to mow the lawn without polluting the air, neither at the lawnmowing site nor at the utility where the electricity is generated.

Another object of the present invention is to provide a solar powered lawnmower which will be used to mow the lawn without causing excessive noise.

A further object of the present invention is to provide a solar powered lawnmower which will not cause the user to incur any costs related to the energy needed to power the lawnmower.

These and other objects will become apparent upon examination of the Summary of the Invention and the Description of the Preferred Embodiment in view of the drawings.

SUMMARY OF THE INVENTION

The present invention solvess the problems associated with both gasoline powered lawnmowers and electric lawnmowers existent in the prior art. The solar powered lawnmower according to the present invention is powered with electricity generated by photovoltaic cells. Thus, the use of the solar powered lanwmower causes no air pollution to be generated, neither by the user nor by the utility which serves the user. In addition, no energy costs are incurred by the user in order to provide energy for the solar powered lawnmower. Furthermore, the solar powered lawnmower according to the present invention does not cause excessive noise pollution, and there is no need for the use of an extension cord.

The solar powered lawnmower is left out in the sunlight in order to photovoltaically recharge the battery pack, and thus provide power to mow a lawn. Accordingly, the photovoltaic cells of the solar powered lawnmower according to the present invention are positioned on the generally skyward side of the lawnmower handle so that their light-absorbing surfaces may be positioned to face the sun. The angle of the handle, and thus of the light-absorbing surfaces of the photovoltaic cells, to the rays of the sun, is arranged in order that the mean position of the sun's rays during the period of exposure of the cells may be approximately perpendicular to said light-absorbing surfaces, since it is when the rays of the sun are perpendicular to the light-absorbing surfaces of the photovoltaic cells that the photovoltaic generation of electricity is at the maximum rates per unit time and cell surface area.

BRIEF DESCRIPTION OF THE DRAWINGS

The solar powered lawnmower according to the present invention is illustrated in the accompanying drawings in which.

While the invention will be described in connection with the presently preferred embodiment, it will be understood that it is not intended to limit the invention to this embodiment. On the contrary, it is intended to cover all alternatives, modifications, and equivalents as may be included in the spirit of the invention as defined in the appended claims.

DESCRIPTION OF THE PREFERRED EMBODIMENT

Figure 1:
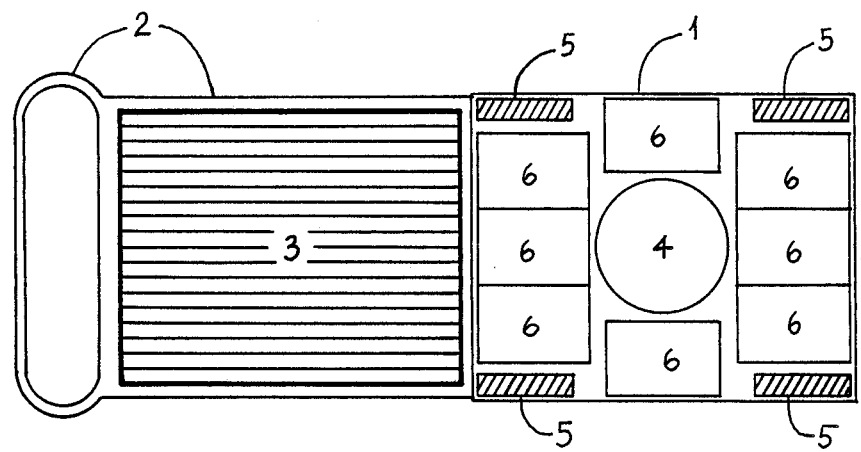
FIG. 1 is a simplified top view of the solar powered lawnmower.

As shown in FIG. 1, the solar powered lawnmower according to the present invention comprises a housing 1 for the cutting blade, electric motor, battery pack, and wheels, and a protruding handle 2 into which photovoltaic cells 3 are built.

The positioning of the components within the housing is also shown in FIG. 1. The electric motor 4 is positioned in the center of the housing, the wheels 5 are in the four corners, and the battery pack 6 is placed in the leftover areas.

The solar powered lawnmower according to the present invention is equipped with photovoltaic cells in order to recharge the battery pack which in turn provides power to the electric motor. The photovoltaic cells 3 are arranged in a panel which is positioned in the region defined by the perimeter of the handle 2 of the solar powered lawnmower. This placement of the photovoltaic cell panel within the handle allows for the panel to be tilted at the same angle to the rays of the sun at which the handle is tilted. This angle is arranged in order that the mean position of the sun's rays during the period of exposure of the cells may be approximately perpendicular to the light-absorbing surfaces of the photovoltaic cells, sincee it is when the rays of the sun are perpendicular to said light-absorbing surfaces that the photovoltaic generation of electricity is at the maximum rates per unit time and cell surface area.

Figure 2:
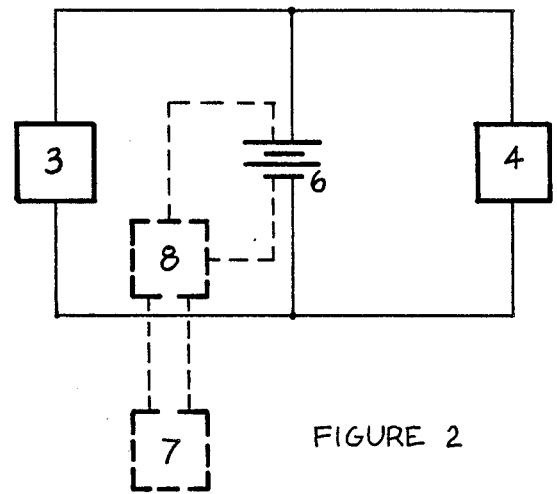
FIG. 2 is a schematic showing the electrical configuration of the invention.

A schematic diagram for the electrical configuration is shown in FIG. 2. The photovoltaic cells 3 recharge the battery pack 6, which in turn supplies power to the electric motor 4. Access to standard AC current 7 in case of insufficient photovoltaic is achieved by means of a detachable electric cord, a retractable electric cord, or a small electric cord which is meant to be used with an extension cord. The AC current is wired to a converter 8 in order to supply the battery pack 6 with compatible DC current.

Any suitable features for a domestic lawnmower may be used for the solar powered lawnmower. For instance, a rear or side bag may be used to collect the cuttings. The solar powered lawnmower according to the present invention will not be limited to the features described above. Furthermore, it will be understood that the shape of the housing and the handle, the positioning of the components in the housing and the handle, the electrical configuration of the solar powered lawnmower, and the materials and construction employed in the making of the solar powered lawnmower may be different from the above descriptions without departing from the scope of the invention.

It is the Inventor's intention in the following claims to cover such modifications and variations as fall within the true spirit and scope of the invention.

The invention claimed is:

1. A lawnmower comprising, in combination, an electric motor, a rechargeable battery park, and a panel of photovoltaic cells, with said motor, said battery pack, and said photovoltaic cells electrically connected, which has said photovoltaic cells positioned in the region of the lawnmower defined by the perimeter of the handle of the lawnmower so that said photovoltaic cells are tilted at the same angle as the handle, with the angle arranged to be approximately perpendicularr to the rays of the sun during periods of solar exposure to said photovoltaic cells, which has said battery pack recharged with the electricity generated by said photovoltaic cells when the lawnmower is placed in the sunlight, so that said battery pack then possesses the means to power said electric motor.

2. The lawnmower according to claim 1, which further comprises the means to employ standard AC current in order to recharge said battery pack in case of insufficient photovoltaic recharging.

* * * * *